Patented Nov. 18, 1952

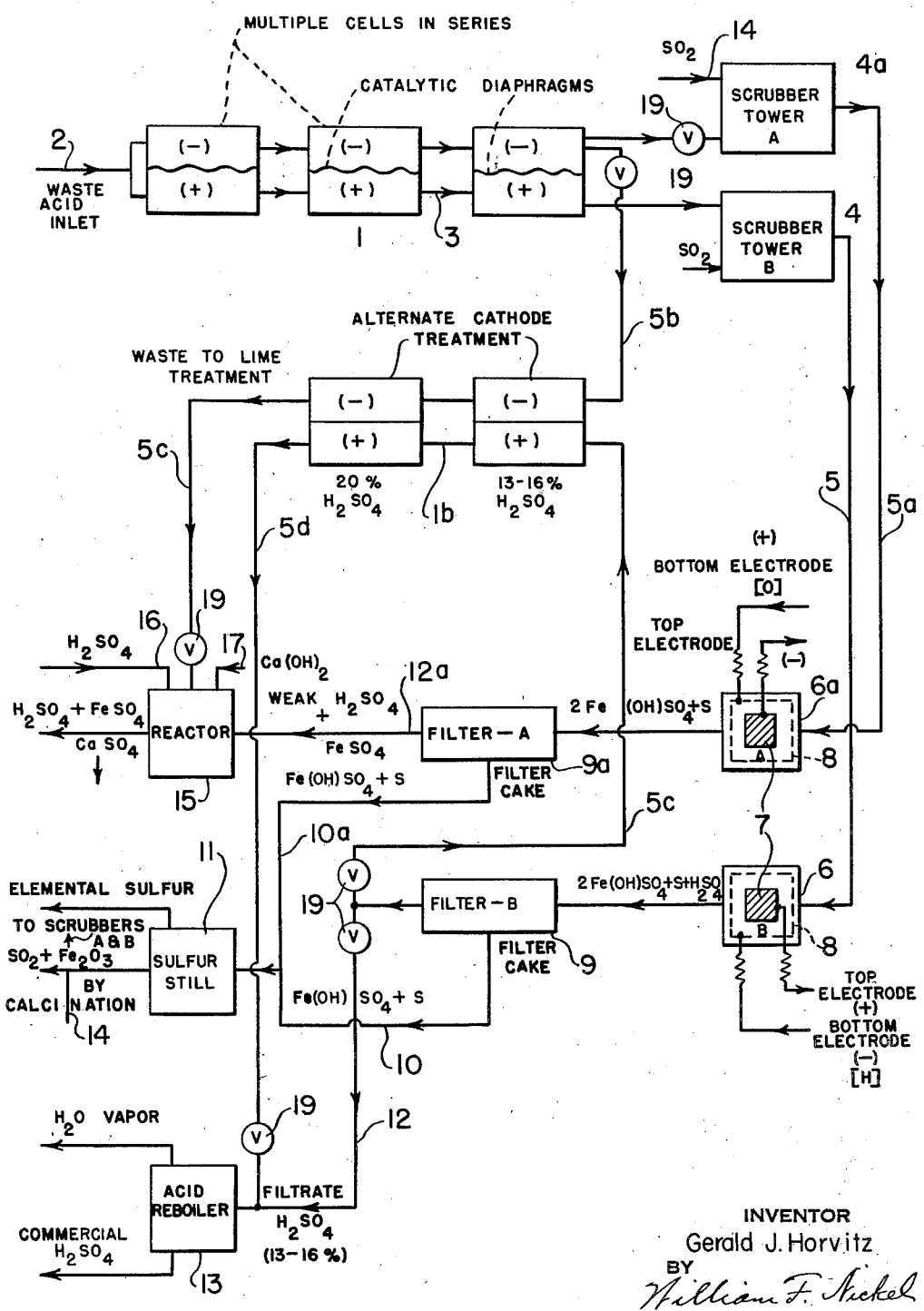

2,618,592

UNITED STATES PATENT OFFICE 2,618,592

ELECTROLYTIC PROCESS FOR RECOVERING BY-PRODUCTS FROM INDUSTRIAL WASTE LIQUORS

Gerald J. Horvitz, Woodmere, N. Y.

Application April 22, 1949, Serial No. 89,004

10 Claims. (Cl. 204—93)

My invention is an improved process for the treatment of industrial waste products; and particularly waste liquors containing acids, in order to recover substances that are valuable for further use.

An important object is to perform such treatment and to effect such recovery without the employment of any additional chemical reagents except cheap lime compounds; and these play a part only in the final stages of the treatment.

Another object is to provide a process in which the bulk of the reactions is brought about by an electric potential operating within electrolytic cells and vertical electrolyzers. Some of the resulting compounds are utilized in the succeeding steps of the process.

The invention is especially adapted for the treatment of liquids which will yield sulphuric acid, sulphates and other chemicals.

The nature and advantages of the invention are made clear in the following description and the novel features are pointed out in the appended claims. This disclosure, however, is explanatory only and changes in details may be adopted without departure from the principle by which the improvement is distinguished.

The figure is a diagram illustrating the successive steps of the process and the apparatus required.

The apparatus employed comprises a multiple series of electrolytic cells partitioned with diaphragms incorporating asbestos or glass fiber cloth or with diaphragms suitably precoated with silicates to form both anode and cathode compartments or chambers, scrubber towers, vertical electrolyzers, reactor, sulphur still, and reboiler apparatus. Utilization of waste sulphur dioxide gas as a reducing agent is one of the characteristic features of this invention. It can be obtained as a by-product of the process or otherwise.

An important object of this process is the treatment of industrial waste acid liquors having a varying composition from 5 to 25% of sulphuric acid and from 5% to 35% of ferrous sulphate, for the purpose of separating and concentrating the acid and removing the sulphur and hydrolyzed iron sulphate from the liquor.

The waste acid liquor is first passed through the multiple series of partitioned cells 1 in which a disassociation of salts and migration of the sulphuric acid takes place by the action of the electrical potential. The liquor is admitted to the first through a supply pipe 2 and flows to the succeeding cells through the pipes 3. A diaphragm as above described in each cell divides it into an anode chamber indicated by the + sign, and a cathode chamber indicated by the — sign; and the anode chambers are connected in series by the pipes 3; as are also the cathode chambers.

On the basis of an industrial waste acid liquor containing approximately 8% sulphuric acid and 11½% of ferrous sulphate passing through the cells 1, the sulphuric acid is brought to a concentration of about 13 to 30% in the anodic chambers.

The liquor issuing from the cells flows to the scrubbing towers 4 and 4a, where it is utilized as a washing medium to scrub out the sulphur dioxide from waste industrial gases generated during a refinishing stage in the process of manufacturing titanium dioxide, or from the sulphur dioxide gas produced in the sulphur still, as set forth later herein.

The anodic solution passes out of the scrubber 4, through a pipe 5 into the vertical electrolyzer 6 where nascent hydrogen is produced and rises from the bottom electrode 8 through the solution, producing a precipitate of hydrolyzed iron sulphate and sulphur. The other top electrode is indicated at 7. The liquor issuing from the vertical electrolyzer 6 is passed through a filter 9 for removal of both hydrolyzed iron sulphate and sulphur. The precipitate resulting is then diverted through a pipe 10 to the sulphur still 11 which separates the elemental sulphur from the iron salt. The latter is eventually, if desired, converted to ferric oxide by calcination. The sulphur dioxide produced by this sulphur still is transmitted to the aforementioned scrubbers 4 and 4a, through pipes indicated at 14.

The filtrate from filter 9, which contains from 13 to 30% of sulphuric acid, is transferred continuously through a pipe 12 to a suitable reboiler 13, described in the application of A. L. Nugey, Serial No. 29,901, where excess water is evaporated to convert the weak sulphuric acid into concentrated sulphuric acid ranging from 60 to 66 Bé. sulphuric acid (77.67 to 93.19% $H_2SO_4$).

The cathodic solution issues from the cathode chambers of the cells 1 and enters scrubber 4a where it is reacted with sulphur dioxide gas, and then passes through a pipe 5a into the vertical electrolyzer 6a. This electrolyzer is equipped with the positive electrode 8 on its bottom and a negative pole 7 at the top, and precipitates hydrolyzed iron sulphate and sulphur, by the action of liberated nascent oxygen. The liquor next is passed through the filter 9a and the precipitate in this filter is conveyed through a pipe 10a to the sulphur still 11, where the same treatment is given as with the precipitate from filter 9.

The liquid filtrate issuing from filter 9a, which consists of weak sulphuric acid and iron sulphate is passed through a pipe 12a into the reactor vessel 15 where it is treated with lime compounds, as described in the application of A. L. Nugey, Serial No. 775,201, to precipitate calcium sulphate. The lime compounds are either quick lime or hydrated lime.

The apparatus may include means for further deconcentrating the original cathodic solution by passing it through a pipe 5b to additional electrolytic cells 1b. The anodic solution is the recycled filtrate issuing from filter 9, which flows back through a pipe 5c to be further concentrated in percentage of sulphuric acid at each cell progression and simultaneously the cathodic solution is deconcentrated, and caused to flow on to the reactor vessel 15 for the lime treatment. As the sulphuric acid concentration rises in the anodic solution at the end of the series run, it is then passed through a pipe 5d to the reboiler 13, for concentration to 60–66° Bé. sulphuric acid. Shut-off valves 19 are included in the piping wherever they can be advantageously utilized.

The probable reactions occurring in this process are:
In multiple cells:

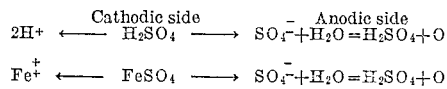

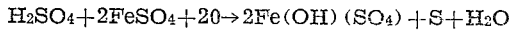

From cathodic cells processed in nascent oxygen electrolyzer:

$$H_2SO_4 + 2FeSO_4 + 2O \rightarrow 2Fe(OH)(SO_4) + S + H_2O$$

From anodic cells processed in nascent hydrogen electrolyzer:

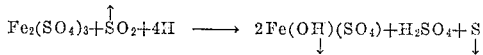

Having described my invention, what I believe to be new is:

1. The process of treating liquor containing sulphuric acid and ferrous sulphate consisting in dividing the liquor into two separate streams, passing one stream through one series of chambers and the other stream through another series of chambers, maintaining the separation of each series from the other by diaphragms, impressing a positive electric potential on the chambers of the one series, and a negative potential on the chambers of the other series, scrubbing each of said streams separately in the presence of sulphur dioxide, subjecting each steam to further electrolytic action, treating the one stream from the one series of chambers having the positive potential during the further electrolytic action with nascent hydrogen, treating the other stream with nascent oxygen during said further electrolytic action, to form a precipitate of hydrolyzed iron sulphate and sulphur in each stream, removing said precipitate from each stream separately, converting the ferrous sulphate remaining in the other stream into an insoluble salt to separate said insoluble salt from the sulphuric acid in said other stream, and boiling the remainder of the first stream to concentrate the acid therein.

2. The process of treating liquor containing sulphuric acid and other compounds, consisting in dividing the liquor into two separate streams, passing one stream through one series of chambers, and the other stream through another series of chambers, maintaining the separation of each series from the other by diaphragms between the two, impressing a positive electric potential on the chambers of the one series and a negative potential on the chambers of the other series, scrubbing the one stream issuing from said one series of chambers in the presence of sulphur dioxide, subjecting it to further electrolytic action, treating said one stream during said further electrolytic action with nascent hydrogen to form a precipitate of hydrolyzed iron sulphate and sulphur therein, removing said precipitate, then conducting each of the two streams separately through a separate series of additional diaphragmed electrolytic chambers, boiling the contents of the one stream after it issues from said last-named additional chambers, and converting the soluble salt in the other stream into insoluble salt to precipitate the latter.

3. The process according to claim 1, which also consists in distilling the precipitate to obtain sulphur, and sulphur and iron compounds.

4. The process according to claim 1, which also includes distilling the precipitate to obtain sulphur dioxide and ferric oxide, and conducting the sulphur dioxide back to the streams issuing from said chambers.

5. The process of treating liquor containing sulphuric acid and ferrous sulphate consisting in dividing the liquor into two separate streams, passing one stream through one series of chambers and the other stream through another series of chambers, maintaining the separation of each series from the other by diaphragms, impressing a positive electric potential on the chambers of the one series and a negative potential on the chambers of the other series, scrubbing each of said streams separately in the presence of sulphur dioxide, and subjecting each stream to further electrolytic action, treating the one stream from the one series of chambers having the positive potential during the further electrolytic action with nascent hydrogen, treating the other stream with nascent oxygen during said further electrolytic action, to form a precipitate of hydrolyzed iron sulphate and sulphur in each stream, removing said precipitate from each stream separately, converting the ferrous sulphate in the other stream by means of quick lime into insoluble sulphate to separate the latter from the sulphuric acid in said other stream, and boiling the remainder of the one stream to concentrate the sulphuric acid therein.

6. The process according to claim 5, which consists in distilling the precipitate to obtain sulphur and iron compounds.

7. The process according to claim 5, which also includes distilling the precipitate to obtain sulphur, sulphur dioxide and ferric oxide, and conducting the sulphur dioxide back to the streams at the point of the scrubbing action.

8. The process of treating liquor containing sulphuric acid and ferrous sulphate, consisting in dividing the liquor into two separate streams, passing one stream into one series of chambers, and the other stream into another series of chambers, maintaining the separation of each series from the other by diaphragms between the two, impressing a positive electric potential on the chambers of the one series, and a negative potential on the chambers of the other series, scrubbing the one stream issuing from said one series of chambers in the presence of sulphur dioxide, and subjecting it to further electrolytic action, treating said one stream during said further electrolytic action with nascent hydrogen to form a precipitate of hydrolyzed iron sulphate and sulphur therein, filtering said precipitate from said one stream, then conducting said one stream and the other stream likewise in through a separate series of additional diaphragmed electrolytic chambers, boiling the contents of the one stream as it issues from said last-named additional chambers and converting soluble salt in the other stream into insoluble salt to precipitate the latter.

9. The process of treating liquor containing sulphuric acid and ferrous sulphate consisting in dividing the liquor into two separate streams, passing one stream through one series of chambers and the other stream through another series of chambers, maintaining the separation of each series from the other, impressing a positive electric potential on the chambers of the one series, and a negative potential on the chambers of the other series, scrubbing said streams separately in the presence of sulphur dioxide, subjecting each stream to further electrolytic action, treating the one stream from the one series of chambers having the positive potential during the further electrolytic action with nascent hydrogen, treating the other stream with nascent oxygen during said further electrolytic action, to form a precipitate of hydrolyzed iron sulphate and sulphur in each stream, removing said precipitate from each stream separately, converting the ferrous sulphate remaining in the other stream into an insoluble salt to separate said insoluble salt from the sulphuric acid in said other stream, and boiling the remainder of the first stream to concentrate the acid therein.

10. The process of treating liquor containing sulphuric acid and other compounds, consisting in dividing the liquor into two separate streams, passing one stream through one series of chambers, and the other stream through another series of chambers, maintaining the separation of each series from the other, impressing a positive electric potential on the chambers of the one series and a negative potential on the chambers of the other series, scrubbing the one stream issuing from said one series of chambers in the presence of sulphur dioxide, subjecting it to further electrolytic action, treating said one stream during said further electrolytic action with nascent hydrogen to form a precipitate of hydrolyzed iron sulphate and sulphur therein, removing said precipitate, then conducting each of the two streams separately through a separate series of additional electrolytic chambers, boiling the contents of the one stream after it issues from said last-named additional chambers, and converting the soluble salt in the other stream into insoluble salt to precipitate the latter.

GERALD J. HORVITZ.

REFERENCES CITED

The following references are of record in the file of this patent:

UNITED STATES PATENTS

| Number | Name | Date |
|---|---|---|
| 1,278,308 | Cullen | Sept. 10, 1918 |
| 2,056,929 | Moore | Oct. 6, 1936 |
| 2,120,840 | McCullough | June 14, 1938 |